(12) United States Patent
Li et al.

(10) Patent No.: US 9,264,891 B2
(45) Date of Patent: Feb. 16, 2016

(54) PHYSICAL CELL IDENTITY ALLOCATION (75) Inventors: Mingxin Li, Beijing (CN); Jing Liu, Beijing (CN); Hua Zhang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 67 days.

(21) Appl. No.: 14/355,198

(22) PCT Filed: Dec. 2, 2011

(86) PCT No.: PCT/CN2011/002020
§ 371 (c)(1),
(2), (4) Date: Apr. 29, 2014

(87) PCT Pub. No.: WO2013/078573
PCT Pub. Date: Jun. 6, 2013

(65) Prior Publication Data
US 2014/0369285 A1  Dec. 18, 2014

(51) Int. Cl.
*H04W 24/02* (2009.01)
*H04W 8/26* (2009.01)
*H04W 88/08* (2009.01)

(52) U.S. Cl.
CPC ............... *H04W 8/26* (2013.01); *H04W 24/02* (2013.01); *H04W 88/08* (2013.01)

(58) Field of Classification Search
USPC ......................................................... 370/329
See application file for complete search history.

(56) References Cited

U.S. PATENT DOCUMENTS

| 8,649,791 | B1 * | 2/2014 | Wohld ........................ 455/446 |
| 8,660,570 | B2 | 2/2014 | Han et al. |
| 2011/0008652 | A1 | 1/2011 | Lee et al. |
| 2011/0038279 | A1 | 2/2011 | Cho et al. |
| 2011/0038326 | A1 | 2/2011 | Davies et al. |
| 2011/0059744 | A1 | 3/2011 | Won et al. |
| 2011/0086652 | A1 * | 4/2011 | So et al. ........................ 455/501 |
| 2011/0190000 | A1 | 8/2011 | Kwun |

(Continued)

FOREIGN PATENT DOCUMENTS

| CN | 101990210 | 3/2011 |
| EP | 2320693 | 5/2011 |

(Continued)

OTHER PUBLICATIONS

PCT International Preliminary Report on Patentability (Chapter I) for Counterpart International Application No. PCT/CN2011/002020, (Jun. 12, 2014), 6 pages.

(Continued)

*Primary Examiner* — Robert M Morlan
(74) *Attorney, Agent, or Firm* — NDWE (57) ABSTRACT

The invention discloses Physical Cell Identity (PCI) allocation in a cellular network. Radii of an inner boundary circle of a first and second cell are each estimated according to a cell distance relation model. Signal strengths within the inner boundary circles of the first and second cells are each greater than a first threshold. Then radii of an outer boundary circle of the first and second cell are each estimated according to the cell distance relation model. The signal strengths within the outer boundary circles of the first and second cells are each greater than a second threshold, where the second threshold is lower than the first threshold. The second cell is allocated a PCI based on a distance relation between the first cell and the second cell.

12 Claims, 6 Drawing Sheets

(56) References Cited

U.S. PATENT DOCUMENTS

2013/0150057 A1* 6/2013 Cho et al. .................. 455/449
2014/0301347 A1* 10/2014 Nanri ......................... 370/329

FOREIGN PATENT DOCUMENTS

EP         2330842 A1      6/2011
WO     WO-2011/009405     1/2011

OTHER PUBLICATIONS

PCT International Search Report for Counterpart International Application No. PCT/CN2011/002020, (Sep. 13, 2012), 4 pages.
3GPP TR 36.902 V9.3.1, "Evolved Universal Terrestrial Radio Access Network (E-UTRAN); Self-configuring and self-optimizing network (SON) use cases and solutions", *3rd Generation Partnership Project; Technical Specification Group Radio Access Network*; (Release 9), http://www.3gpp.org/DynaReport/36902.htm, (Mar. 2011), 21 pages.
3GPP TS 36.211 V8.4.0 "Evolved Universal Terrestrial Radio Access (E-UTRA); Physical channels and modulation", *ETSI TS 136 211 V8.4.0; LTE*; (*3GPP TS 36.211 version 8.4.0 Release 8*), http://www.3gpp.org/DynaReport/36211.htm, (Nov. 2008), 87 pages.
3GPP TS 36.300 V10.11.0; "Evolved Universal Terrestrial Radio Access (E-UTRA) and Evolved Universal Terrestrial Radio Access Network (E-UTRAN); Overall description; Stage 2", *3rd Generation Partnership Project; Technical Specification Group Radio Access Network*; (*Release 10*), http://www.3gpp.org/DynaReport/36300.htm, (Sep. 2013), 195 pages.
"Self-Optimizing Networks: The Benefits of SON in LTE", *4G Americas White Paper*, (Jul. 2011), 69 pages.
Extended European Search Report, EP Application No. 11876490.1, dated Jun. 23, 2015, 9 pages.
"PCI Assignment of HeNB based on HeNB GW," Aug. 24-28, 2009, 2 pages, R3-091804, 3GPP TSG-RAN WG3 Meeting #65, Shenzhen, P.R. China, ETRI.
"Automatic Physical Cell ID Assignment," Jul. 7-11, 2008, 5 pages, S5-081171, 3GPP TSG-SA5 (Telecom Management) Meeting SA5#60, Sophia Antipolis, France, Nokia Siemens Networks.
"SON USE Case: Cell Phy_ID Automated Configuration," Feb. 11-15, 2008, 4 pages, R3-080376, 3GPP TSG-RAN WG3 Meeting #59, Sorrento, Italy, Nokia Siemens Networks.

* cited by examiner

PHYSICAL CELL IDENTITY ALLOCATION

CROSS-REFERENCE TO RELATED APPLICATIONS

This application is a National stage of International Application No. PCT/CN2011/002020, filed Dec. 2, 2011, which is hereby incorporated by reference.

TECHNICAL FIELD

The present invention generally relates to wireless communication, particularly to a method and apparatus for allocating a Physical Cell Identity (PCI) in a cellular network.

BACKGROUND

With the rapid deployment of the $3^{rd}$ Generation (3G) network, the operators need to reduce costs of network construction and operation. The Next Generation Mobile Network (NGMN) association of operators brings forward requirements on management simplicity and cost efficiency, and summarizes such requirements on Self-Organizing Networks (SON) in a number of operator use cases.

Currently, automation configuration of PCI is important for work reduction for wireless operators in a Long Term Evolution (LTE) system. PCI is used for uniquely identifies a cell in a network. Each cell is assigned an available PCI. A basic principle for allocating the PCIs among cells is to be collision-free and confusion-free. Communication is impossible within cells with a conflicted PCI, as the User Equipment (UE) can not detect or differentiate the cells.

However, the number of PCIs allocable in the entire communication is a limited constant. Based on the LTE specification of the physical layer detailed in 3GPP TS 36.211-840, there are a total of 504 unique PCIs. These PCI are grouped into 168 unique physical layer cell identity groups, where each group contains three unique identities. In contrast, a typical commercial network may have 300 sites/base stations, assuming three sectors per site leads to almost a thousand cells. In the practical LTE network, it is necessary to multiplex or reuse such PCIs. The number of cells in the system is still increasing dramatically. For example, three sector base stations are large-scale deployed in Korea by now, but operators have decided to deploy more six sector base stations in future. In addition, micro base stations (also known as femto base stations) are additionally installed to optimize coverage and capacity. It is necessary to efficiently multiplex or reuse the PCIs while preventing the possible conflicts.

Typically operators use an offline planning tool or depend on manual determination to develop a PCI deployment plan. The plan uses basic information such as eNodeB location, potential neighbors, etc., to determine the PCI for each eNodeB/sector. Such an allocation is carefully reviewed to ensure that the network does not have any PCI conflicts. The determined PCI values are communicated to each eNodeB during the installation using the configuration files or manually inputted by the staff. It is no doubt that such a process does not lend itself to subsequent changes and is prone to human error.

3GPP TS 36.902 (Release 9) describes the case of PCI allocation. It only denotes the target that system can select a PCI for a newly deployed radio cell and requires that the PCI assignment shall be collision-free and confusion-free. However, it does not propose any solution for implementing the PCI allocation.

CN 101990210A proposes a method to divide PCIs into two consecutive aggregates. One of them is for macro cells and another one is for micro cells, and the cell radius is only a typical value which has risk to avoid PCI conflict. However, this method still needs operators to plan network at first. It doesn't mention any methods to implement auto configuration.

SUMMARY

Therefore, it is an object to solve at least one of the above-mentioned problems.

According to an aspect of the invention, a method for Physical Cell Identity (PCI) allocation in a communication node of a cellular network is provided. In the method, a radius $R_1$ of an inner boundary circle $C_1$ of a first cell and a radius $R_2$ of an inner boundary circle $C_2$ of a second cell is estimated according to a cell distance relation model. Signal strengths within $C_1$ and within $C_2$ are greater than a first threshold T respectively. Then a radius $R_1'$ of an outer boundary circle $C_1'$ of the first cell and a radius $R_2'$ of an outer boundary circle $C_2'$ of the second cell is estimated according to the cell distance relation model. The signal strengths within $C_1'$ and within $C_2'$ are greater than a second threshold T' respectively, where T' is lower than T. The second cell is allocated a PCI based on a distance relation between the first cell and the second cell. A distance $S_{1,2}$ between the first cell and the second cell is compared with $Max[(R_1'+R_2), (R_1+R_2')]$, and the second cell will be allocated the same PCI as that of the first cell, if the distance $S_{1,2}$ is greater than $Max[(R_1'+R_2), (R_1+R_2')]$.

The communication node may further allocate to the second cell a PCI which is different from that of the first cell, if the distance $S_{1,2}$ is not greater than $Max[(R_1'+R_2), (R_1+R_2')]$. When estimating the radii $R_1$, $R_1'$, $R_2$ and $R_2'$, the communication node may obtain a maximum distance $D_1$ from an antenna of the first cell to $C_1$ according to a path loss factor representing propagating loss over the maximum distance $D_1$ and being associated with the corresponding first threshold T, a geography environment factor, a height of the antenna of the cell, and a city scale factor, determine the radius $R_1$ as one half of $D_1$ if the antenna of the first cell is a directional antenna, determine the radius $R_1$ as equal to $D_1$ if the antenna of the first cell is an omni antenna, and repeat the above operations for $C_1'$, $C_2$ and $C_2'$ to determine $R_1'$, $R_2$ and $R_2'$.

The communication node may further compare the distance $S_{1,2}$ between the first cell and the second cell with $(R_1'+R_2')$, and allocate to the second cell the same PCI as that of the first cell, if the distance $S_{1,2}$ is greater than $(R_1'+R_2')$. The PCI may include a group identity part N1. The communication node may allocate to the second cell the PCI with the same group identity part N1 as that of the first cell. The communication node may include an Operation & Maintenance (O & M) entity.

According to another aspect of the invention, an apparatus for allocating a PCI in a cellular network is provided. The apparatus comprises a controlling unit and an interface. The controlling unit is adapted to estimate a radius $R_1$ of an inner boundary circle $C_1$ of a first cell and a radius $R_2$ of an inner boundary circle $C_2$ of a second cell according to a propagation model, where signal strengths within $C_1$ and within $C_2$ are greater than a first threshold T respectively, estimate a radius $R_1'$ of an outer boundary circle $C_1'$ of the first cell and a radius $R_2'$ of an outer boundary circle $C_2'$ of the second cell according to the propagation model, where the signal strengths within $C_1'$ and within $C_2'$ are greater than a second threshold T' respectively, T' being lower than T; and allocate to the second cell a PCI based on a distance relation between the first cell and the second cell. The controlling unit is further adapted to compare a distance $S_{1,2}$ between the first cell and the second cell with Max[$(R_1'+R_2)$, $(R_1+R_2')$], and allocate to the second cell the same PCI as that of the first cell, if the distance $S_{1,2}$ is greater than Max[$(R_1'+R_2)$, $(R_1+R_2')$].

BRIEF DESCRIPTION OF THE DRAWINGS

The invention will be described in detail by reference to the following drawings, in which.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments of the invention will be described below with reference to the drawings.

This disclosure proposes to use a propagation model to estimate two types of coverage boundaries for each cell, and allocate PCI based on the distance relation between two cells.

In order to simplify the calculation of the distance between cells, the cell boundaries are illustrated as circles.

Figure 1:
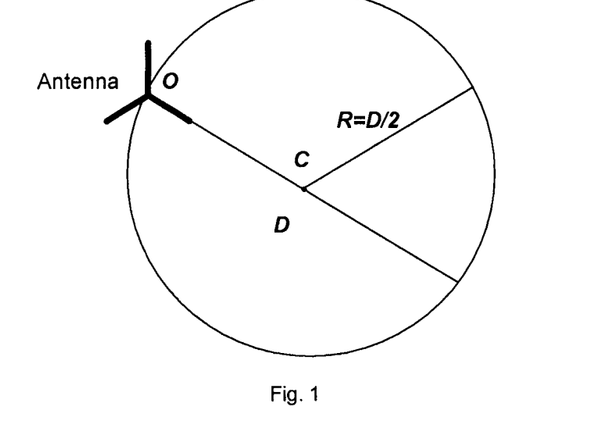
FIG. 1 illustratively shows a cell boundary circle covered by a directional antenna.

FIG. 1 illustratively shows a cell boundary circle covered by a directional antenna. Directional antenna and Omni antenna are typical antennas used in sectors. The present disclosure will consider but not limited to both of them. Theoretically the area covered by the directional antenna is fan-shaped, but for simplicity of calculation it is denoted as equivalent to a circle. As shown in FIG. 1A, the maximum distance covered by the directional antenna (the maximum distance from the antenna to the circle) is presented by D. The antenna position is in the point O, and the point C is the center of the equivalent circle. The radius R of the circle is equal to half of the distance D.

Figure 2:
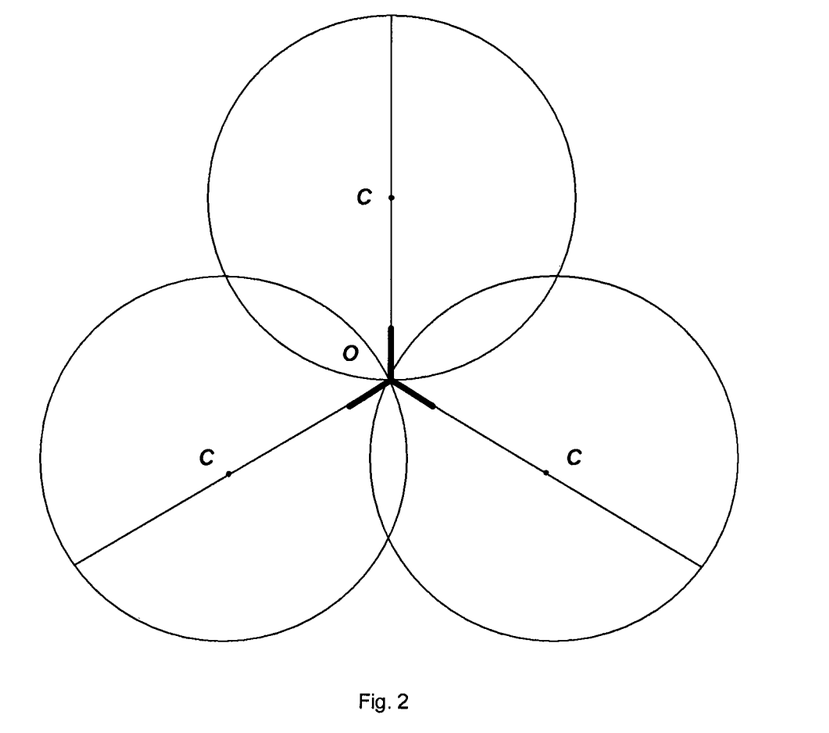
FIG. 2 illustratively shows three cell boundary circles covered by a three-sector site with three directional antennas.

FIG. 2 illustratively shows three cell boundary circles covered by a three-sector site with three directional antennas. The three-sector sites/eNodeBs are typically deployed in commercial networks. As shown in FIG. 2, each cell covered by the corresponding directional antenna can be denoted as an equivalent circle as illustrated in FIG. 1. It should be noted the maximum distance D may be different among cells, because the power and coverage requirement of each sector may be different.

Figure 3:
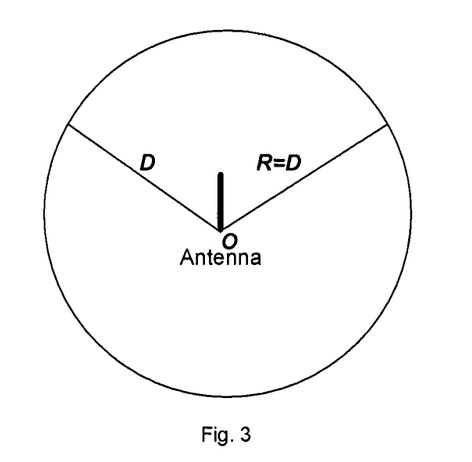
FIG. 3 illustratively shows a cell boundary circle covered by an omni antenna.

FIG. 3 illustratively shows a cell boundary circle covered by an omni antenna. As shown in FIG. 3, the antenna position O is also the center C of the equivalent circle, and the maximum distance D covered by the omni antenna is equal to the radius R of the circle.

The maximum distance D can be obtained by measuring the signal strength within the cell and determining the boundary of the cell. To facilitate the automatic configuration, the invention proposes to use existing cell distance relation models to estimate the boundary of the cell.

In an embodiment, the maximum distance D and in turn the radius R of the boundary circle of the cell are estimated by a modified Okumura-Hata model.

According to the modified Okumura-Hata model, the path/propagation loss $L_{path}$ at a point with a distance d from the antenna can be calculated by $$L_{path} = A - 13.82 \log H_b + (44.9 - 6.55 \log H_b) \log d - C_h \quad (1)$$

where A is a geography environment factor, $H_b$ is a height of the antenna of the cell, and $C_h$ is a city scale factor.

For a small or medium size city, $$C_h = 0.8 + (1.1 \log F - 0.7) \log H_m - 1.56 \log F \quad (2)$$

where F represents the number of UEs in the cell and $H_m$ represents an (average) height of the antennas of UEs.

For a large city, $$C_h = \begin{cases} 8.29(\log(1.54H_m))^2 - 1.1, & \text{if } 150 \leq F \leq 200 \\ 3.2(\log(11.75H_m))^2 - 4.97, & \text{if } 200 \leq F \leq 2800 \end{cases} \quad (3)$$

The geography environment factor A varies among different geographic environment such as Urban, Suburban, Rural and Open space. It can be obtained by $$A = \begin{cases} 68.16 + 26.16\log F, & \text{Urban} \\ 62.16 + 26.16\log F, & \text{Suburban} \\ 48.26 + 26.16\log F, & \text{Rural} \\ 38.16 + 26.16\log F, & \text{Open} \end{cases} \quad (4)$$

The formula (1) can be transformed to $$d = \log^{-1} \frac{L_{path} - A + 13.82\log H_b + C_h}{(44.9 - 6.55\log H_b)} \quad (5)$$

The factors A, $H_b$ and $C_h$ are known constants for a specific cell. The maximum distance D can be calculated by formula (5) as long as the $L_{path}$ at the point with the maximum distance D from the antenna is determined. For example, if a point where the signal strength is equal to a threshold T of −100 dBm, it can be regarded as the boundary of the cell and the distance between that point and the antenna can be regarded as maximum distance D. The signal strength can be represented by e.g. by Received Signal Code Power (RSCP). The $L_{path}$ at that point is associated with that threshold T. The maximum distance D thus can be calculated by formula (5) when the $L_{path}$ at the boundary is known. For a cell covered by a directional antenna, the radius R of the boundary is equal to one half of D, and for a cell covered by an omni antenna, the radius R of the boundary is equal to D.

It is should be understood that the estimation of the maximum distance D and in turn the radius R of the boundary circle of the cell can be based on other existing or even future propagation models, such as COST231-Hata, LEE, COST231 Walfish-Ikegami, etc.

In order to increase the flexibility and precision in PCI allocation, the invention proposes to define two boundaries for each cell, i.e. an inner boundary and an outer boundary.

Figure 4:
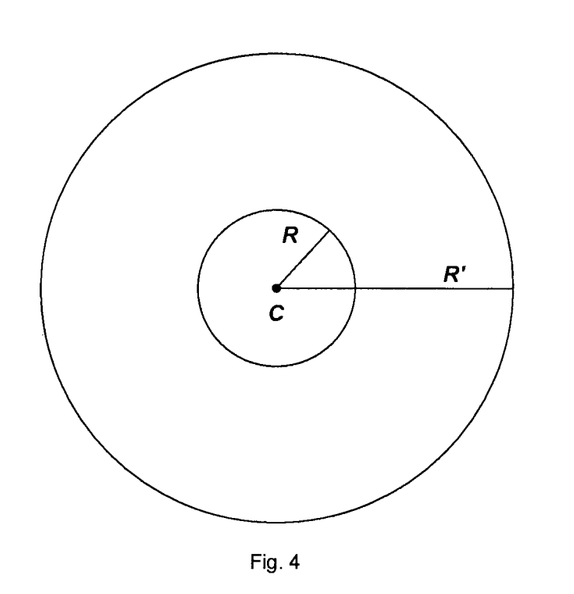
FIG. 4 illustratively shows an inner boundary circle and an outer boundary circle for a cell.

FIG. 4 illustratively shows an inner boundary circle and an outer boundary circle for a cell. The radius of the inner circle is denoted by R and the radius of the outer circle is denoted by R'. Signal strength within the inner boundary is greater than a first threshold and signal strength within the outer boundary is greater than a second threshold which is lower than the first threshold. For example, the first threshold T may be set to −100 dBm and the second threshold T' may be set to −120 dBm. The inner boundary can be considered as the cell coverage where the signal strength is high enough for the UE to communicate with the antenna. Signal strength outside the outer boundary will decrease to a very small level, e.g. less than −120 dBm, and its interference to other neighboring cells can be ignored. However, signal strength between the two boundaries, although not high, may have influence to the neighboring cells. For example, we assume the sites are located in the urban of large city, the channel frequency is equal to 2.6 GHz and transmitting power P is 20 W. The cell is a sector covered by a directional antenna. The height of cell antenna $H_b$ is 30 meters, the height of UE antenna $H_1$ is 1.5 meters, the first threshold T is −100 dBm and the second threshold T' is −120 dBm. It can be estimated by formula (5) that the maximum distances of the inner boundary circle and the outer boundary circle are equal to 1.47 km and 5.44 km, respectively. Therefore the radii of the inner boundary circle and the outer boundary circle are 0.735 km and 2.72 km respectively.

FIGS. 5A-5E illustratively show scenarios of different distances between two cells.

Figure 5A:
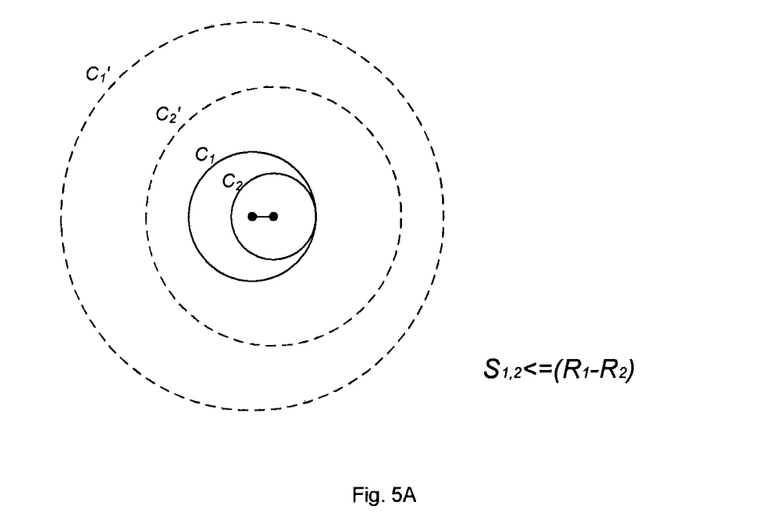
FIGS. 5A-5E illustratively show scenarios of different distances between two cells.

In FIG. 5A, the inner boundary circle $C_1$ of the first cell with the radius $R_1$ and the inner boundary circle $C_2$ of the second cell with the radius $R_2$ are depicted by solid lines, and the outer boundary circle $C_1'$ of the first cell with the radius $R_1'$ and the outer boundary circle $C_2'$ of the second cell with the radius $R_2'$ are depicted by dashed lines. Suppose $R_1$ is greater than $R_2$. The distance between two cells, i.e. distance between center points of the two cells $S_{1,2}$ is not greater than $(R_1-R_2)$. In other words, the inner circle $C_2$ is surrounded by the inner circle $C_1$. In this scenario, the area within $C_2$ will covered by strong signals from both antenna of the first cell and that of the second cell. If the two cells are allocated with the same PCI, the UE located in $C_2$ will not be able to differentiate the cells and confliction occurs.

Figure 5B:
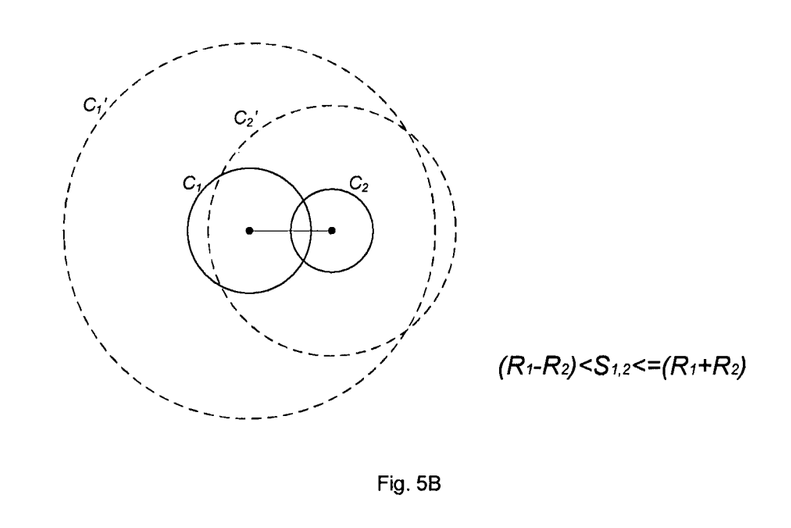

In FIG. 5B, the distance $S_{1,2}$ between two cells is greater than $(R_1-R_2)$, but not greater than $(R_1+R_2)$. As can be seen from FIG. 5B, the inner circle $C_1$ is partly overlapped with the inner circle $C_2$. As consequence, the UE located in that overlapped area will not be able to differentiate the cells and confliction occurs if the two cells are allocated with the same PCI.

Figure 5C:
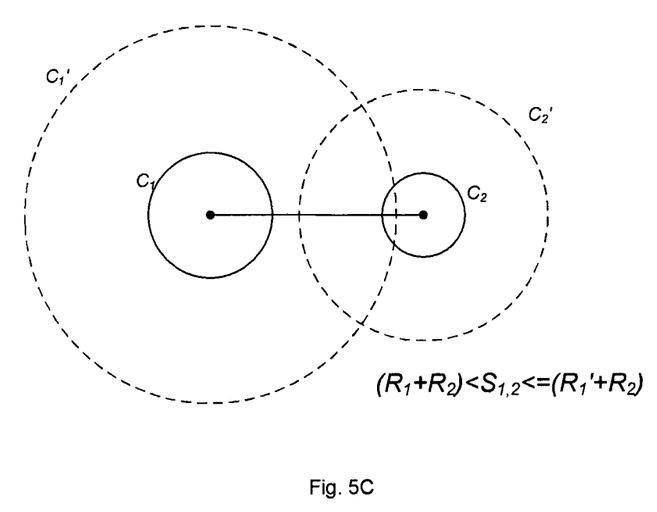

In FIG. 5C, the distance $S_{1,2}$ between two cells is greater than $(R_1+R_2)$, but not greater than $(R_1'+R_2)$. As can be seen from FIG. 5C, the inner circle $C_1$ is not overlapped with the inner circle $C_2$, but the outer circle $C_1$ is partly overlapped with the inner circle $C_2$. The UE located in that overlapped area is served by the second cell and meanwhile receives interference signals from the first cell. It is possible that confliction occurs in this scenario. Therefore the two cells can not be allocated with the same PCI.

Figure 5D:
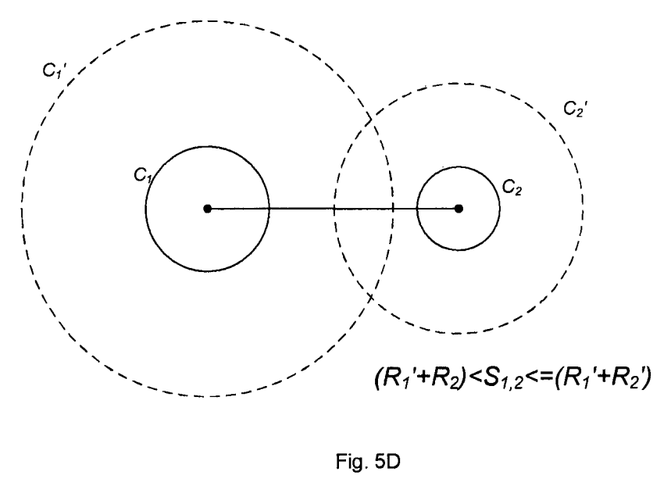

In FIG. 5D, the distance $S_{1,2}$ between two cells is greater than $(R_1'+R_2)$, but not greater than $(R_1'+R_2')$. As can be seen from FIG. 5D, the inner circle $C_1$ is not overlapped with the outer circle $C_2'$, and the inner circle $C_2$ is not overlapped with the outer circle $C_1'$. Since the strength of signal from the second cell is negligible outside the outer circle $C_2'$, the UE located in the inner circle $C_1$ and served by the first cell will not be substantially interfered by signals from the second cell. Analogously, the UE located in the inner circle $C_2$ and served by the second cell will not be substantially interfered by signals from the first cell. Confliction is usually unlikely to occur in this scenario, and the two cells can be allocated with the same PCI.

Figure 5E:
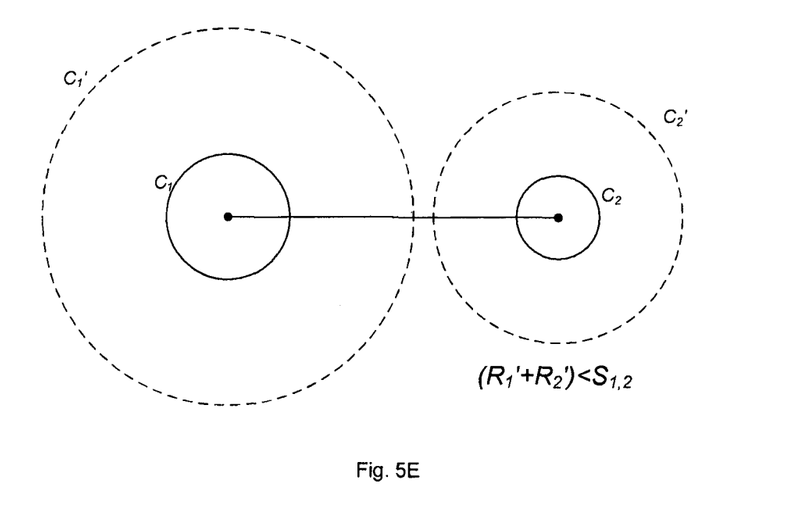

In FIG. 5E, the distance $S_{1,2}$ between two cells is greater than $(R_1'+R_2')$. As can be seen from FIG. 5E, even the outer circles $C_1'$ and $C_2'$ are not overlapped, which means that the two cells are far away enough. Apparently no confliction will occur in this scenario, and the two cells can be allocated with the same PCI.

As can be seen from the above scenarios, assuming the radius of the first cell is greater than that of the second cell, the first cell and the second cell can be allocated with the same PCI if the distance $S_{1,2}$ between them is greater than $(R_1'+R_2)$. Without losing generality, any two cells can reuse the same PCI if the distance $S_{1,2}$ between them is greater than $\text{Max}[(R_1'+R_2), (R_1+R_2')]$.

In an embodiment, the two cells are allocated with the same PCI only if the distance $S_{1,2}$ between them is greater than $(R_1'+R_2')$, which corresponds to the scenario as shown in FIG. 5E. This will further ensure that no confliction will occur when reusing the PCI.

Figure 6:
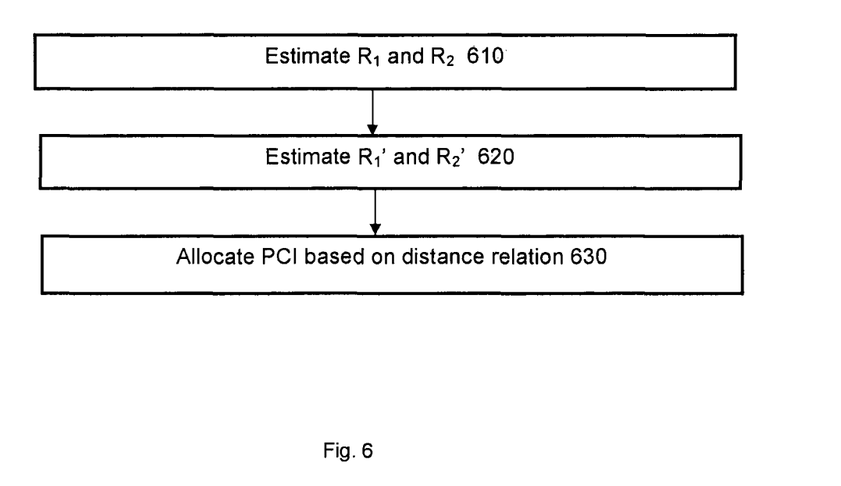
FIG. 6 illustratively shows a method for allocating a PCI in a communication node of a cellular in accordance with an embodiment of the invention.

FIG. 6 illustratively shows a method for allocating a PCI in a communication node of a cellular in accordance with an embodiment of the invention.

In the method as shown in FIG. 6, the communication node estimates at step 610 a radius $R_1$ of an inner boundary circle $C_1$ of a first cell and a radius $R_2$ of an inner boundary circle $C_2$ of a second cell according to a cell distance relation model such as the modified Okumura-Hata model. Signal strengths within $C_1$ and within $C_2$ are greater than a first threshold T respectively. The communication node then estimates at step 620 a radius $R_1'$ of an outer boundary circle CC of the first cell and a radius $R_2'$ of an outer boundary circle $C_2'$ of the second cell according to the cell distance relation model. The signal strengths within $C_1'$ and within $C_2'$ are greater than a second threshold T' respectively, where T' is lower than T. At step 630 the communication node allocates to the second cell a PCI based on a distance relation between the first cell and the second cell. In particular, a distance $S_{1,2}$ between the first cell and the second cell is compared with $\text{Max}[(R_1'+R_2), (R_1+R_2')]$, and the communication node allocates to the second cell the same PCI as that of the first cell, if the distance $S_{1,2}$ is greater than $\text{Max}[(R_1'+R_2), (R_1+R_2')]$. The communication node may allocate to the second cell a PCI which is different from that of the first cell, if the distance $S_{1,2}$ is not greater than $\text{Max}[(R_1'+R_2), (R_1+R_2')]$.

When estimating the radii $R_1$, $R_1'$, $R_2$ and $R_2'$, the communication node may first obtain a maximum distance $D_1$ from an antenna of the first cell to $C_1$ according to a path loss factor representing propagating loss over the maximum distance $D_1$ and being associated with the corresponding first threshold T, a geography environment factor, a height of the antenna of the cell, and a city scale factor. The radius $R_1$ is determined as one half of $D_1$ if the antenna of the first cell is a directional antenna, and determined as equal to $D_1$ if the antenna of the first cell is an omni antenna. Other radii $R_1'$, $R_2$ and $R_2'$ may be determined by repeating the above steps for $C_1'$, $C_2$ and $C_2'$.

The communication node may further lower or eliminate the probability of confliction by applying a more tight restriction. For example, the communication may compare the distance $S_{1,2}$ between the first cell and the second cell with $(R_1'+R_2')$ and allocate to the second cell the same PCI as that of the first cell, if the distance $S_{1,2}$ is greater than $(R_1'+R_2')$.

In an embodiment, the PCI includes a group identity part N1 and a cell identity part N2. According to the 3GPP specification TS 36.211-840, PCI=3*N1+N2, where N1 ranges from 0 to 167, and N2 range from 0 to 2. In other words, there are up to 168 groups in the LTE network and each group may contain 3 PCIs, which means there are 504 unique PCIs available in total. Generally a group of PCIs are allocated to one site (eNodeB). However in order to avoid wasting PCIs, if two cells do not reuse the same PCI, they can be allocated with the same group identity part N1 and belong to the same group. In case the number of sectors/cells covered a site is less than 3, the sectors of several such sites can be allocated with the same group identity part N1 and thus can be viewed as a virtual integrated cluster. If a site has more than 3 sectors, the site can occupy more than one group of PCIs.

The allocation of PCIs can be carried based on either a centralized or distributed policy. In the centralized policy, all the steps for PCI allocation as described above are performed in a communication node including an Operation & Maintenance (O & M) entity such as Operation Support System for Radio & Core (OSS-RC). The communication node may maintain an available PCI list including the unallocated and reusable PCIs. After receiving the request for PCI allocation, the OSS-RC may update the available PCI list, allocate a PCI from the list according to the steps as described above and return the PCI to an eNodeB that the sector/cells belong. The eNodeB then set the allocated PCI for the intended sector. In the distributed policy, after receiving the request for PCI allocation, the OSS-RC signals the available PCI list to the eNodeB and the eNodeB performs the steps for PCI allocation. The eNodeB sets the allocated PCI for the intended sector and informs the OSS-RC of the allocation. The OSS-RC then updates the available PCI list. There are also other policies for the distributed PCI assignment. For example, the OSS-RC may periodically broadcast the available PCIs list to each eNodeB and the new deployed eNodeB may get the other eNodeBs' information by an X2 interface.

Figure 7:
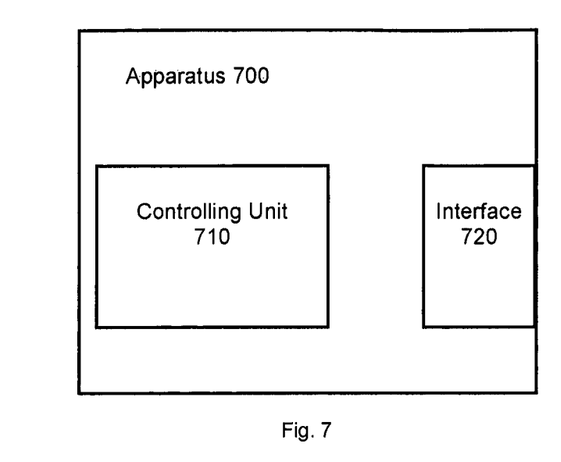
FIG. 7 illustratively shows an apparatus for allocating a PCI in a cellular network in accordance with an embodiment of the invention.

FIG. 7 illustratively shows an apparatus for allocating a PCI in a cellular network in accordance with an embodiment of the invention.

As shown in FIG. 7, the apparatus 700 comprises a controlling unit 710 and an interface 720. The controlling unit 710 is adapted to estimate a radius $R_1$ of an inner boundary circle $C_1$ of a first cell and a radius $R_2$ of an inner boundary circle $C_2$ of a second cell according to a propagation model, where signal strengths within $C_1$ and within $C_2$ are greater than a first threshold T respectively, and estimate a radius $R_1'$ of an outer boundary circle $C_1'$ of the first cell and a radius $R_2'$ of an outer boundary circle $C_2'$ of the second cell according to the propagation model, where the signal strengths within $C_1'$ and within $C_2'$ are greater than a second threshold T' respectively. T' is lower than T. The controlling unit 710 allocates to the second cell a PCI based on a distance relation between the first cell and the second cell. The interface 720 is adapted to send the allocated PCI to the second cell. The controlling unit is adapted to allocate the PCI by comparing a distance $S_{1,2}$ between the first cell and the second cell with $\text{Max}[(R_1'+R_2), (R_1+R_2')]$ and allocating to the second cell the same PCI as that of the first cell, if the distance $S_{1,2}$ is greater than $\text{Max}[(R_1'+R_2), (R_1+R_2')]$.

The controlling unit 710 is further adapted to allocate to the second cell a PCI which is different than that of the first cell, if the distance $S_{1,2}$ is not greater than $\text{Max}[(R_1'+R_2), (R_1+R_2')]$. The controlling unit 710 is further adapted to obtain a maximum distance $D_1$ from an antenna of the first cell to $C_1$ according to a path loss factor representing propagating loss over the maximum distance $D_1$ and being associated with the corresponding first threshold T, a geography environment factor, a height of the antenna of the cell, and a city scale factor, determine the radius $R_1$ as one half of $D_1$ if the antenna of the first cell is a directional antenna, and determine the radius $R_1$ as equal to $D_1$ if the antenna of the first cell is an omni antenna. $R_1'$, $R_2$ and $R_2'$ can be determined by repeating the above operations for $C_1'$, $C_2$ and $C_2'$. The controlling unit 110 is further adapted to compare the distance $S_{1,2}$ between the first cell and the second cell with $(R_1'+R_2')$ and allocate to the second cell the same PCI as that of the first cell, if the distance $S_{1,2}$ is greater than $(R_1'+R_2')$. The controlling unit 710 is further adapted to allocate to the second cell the PCI with the same group identity part N1 as that of the first cell. The apparatus may be located in a communication node including O & M entity, such as the OSS-RC or eNodeB with the O & M functionality.

By using the equivalence circle to represent the boundary of a cell, the distance relation between cells is greatly simplified. In addition, two boundary circles are defined for each cell, and the PCI will be reused in case that the inner boundary is not overlapped with the outer boundary of the other cell. This reduces or eliminates the probability of confliction and meanwhile provides more flexibility and efficiency in PCI allocation. In consequence, the workload of the operators is reduced.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore it is intended that the present invention not be limited to the particular embodiment disclosed as the best mode contemplated for carrying out the present invention, but that the present invention include all embodiments falling within the scope of the appended claims.

The invention claimed is:

1. A method for allocating a Physical Cell Identity (PCI) in a communication node of a cellular network, the method comprising:
estimating a radius ($R_1$) of an inner boundary circle of a first cell and a radius ($R_2$) of an inner boundary circle of a second cell according to a propagation model, where signal strengths within the inner boundary circle of the first cell and within the inner boundary circle of the second cell are greater than a first threshold respectively;
estimating a radius ($R_1'$) of an outer boundary circle of the first cell and a radius ($R_2'$) of an outer boundary circle of the second cell according to the propagation model, where the signal strengths within the outer boundary circle of the first cell and within the outer boundary circle of the second cell are greater than a second threshold respectively, the second threshold being lower than the first threshold;
allocating to the second cell a PCI based on a distance relation between the first cell and the second cell, wherein said allocating comprises:
comparing a distance between the first cell and the second cell with $\text{Max}[(R_1'+R_2), (R_1+R_2')]$; and
responsive to determining that the distance is greater than $\text{Max}[(R_1'+R_2), (R_1+R_2')]$, allocating to the second cell the same PCI as that of the first.

2. The method of claim 1, wherein said allocating to the second cell the PCI based on the distance relation between the first cell and the second cell further comprises:
responsive to determining that the distance is not greater than $\text{Max}[(R_1'+R_2), R_1+R_2')]$, allocating to the second cell a PCI that is different from that of the first cell.

3. The method of claim 1, wherein:
said estimating the radius of the inner boundary circle of the first cell comprises:
obtaining a first maximum distance from an antenna of the first cell to the inner boundary circle of the first cell according to a path loss factor representing propagating loss over the first maximum distance and being associated with the first threshold, a geography environment factor, a height of the antenna of the first cell, and a city scale factor;
determining the radius of the inner boundary circle of the first cell as one half of the first maximum distance when the antenna of the first cell is a directional antenna; and
determining the radius of the inner boundary circle of the first cell as equal to the first maximum distance when the antenna of the first cell is an omni antenna;

said estimating the radius of the outer boundary circle of the first cell comprises:
obtaining a second maximum distance from an antenna of the first cell to the outer boundary circle of the first cell according to a path loss factor representing propagating loss over the second maximum distance and being associated with the second threshold, a geography environment factor, a height of the antenna of the first cell, and a city scale factor;
determining the radius of the outer boundary circle of the first cell as one half of the second maximum distance when the antenna of the first cell is a directional antenna; and
determining the radius of the outer boundary circle of the first cell as equal to the second maximum distance when the antenna of the first cell is an omni antenna;

said estimating the radius of the inner boundary circle of the second cell comprises:
obtaining a third maximum distance from an antenna of the second cell to the inner boundary circle of the second cell according to a path loss factor representing propagating loss over the third maximum distance and being associated with the first threshold, a geography environment factor, a height of the antenna of the second cell, and a city scale factor;
determining the radius of the inner boundary circle of the second cell as one half of the third maximum distance when the antenna of the second cell is a directional antenna; and
determining the radius of the inner boundary circle of the second cell as equal to the third maximum distance when the antenna of the second cell is an omni antenna; and said estimating the radius of the outer boundary circle of the second cell comprises:
obtaining a fourth maximum distance from an antenna of the second cell to the outer boundary circle of the second cell according to a path loss factor representing propagating loss over the fourth maximum distance and being associated with the second threshold, a geography environment factor, a height of the antenna of the second cell, and a city scale factor;
determining the radius of the outer boundary circle of the second cell as one half of the fourth maximum distance when the antenna of the second cell is a directional antenna; and
determining the radius of the outer boundary circle of the second cell as equal to the fourth maximum distance when the antenna of the second cell is an omni antenna.

4. The method of claim 1, wherein said allocating to the second cell the PCI based on the distance relation between the first cell and the second cell further comprises:
comparing the distance between the first cell and the second cell with $(R_1'+R_2')$; and
responsive to determining that the distance is greater than $(R_1'+R_2')$, allocating to the second cell the same PCI as that of the first cell.

5. The method of claim 2, wherein the PCI includes a group identity part, and said allocating to the second cell the PCI which is different from that of the first cell further comprises:
allocating to the second cell the PCI with the same group identity part as that of the first cell.

6. The method of claim 1, wherein the communication node includes an Operation & Maintenance (O & M) entity.

7. An apparatus for allocating a Physical Cell Identity (PCI) in a cellular network, the apparatus comprising:

a controlling unit operative to:
  estimate a radius ($R_1$) of an inner boundary circle of a first cell and a radius ($R_2$) of an inner boundary circle of a second cell according to a propagation model, where signal strengths within the inner boundary circle of the first cell and within the inner boundary circle of the second cell are greater than a first threshold respectively;
  estimate a radius ($R_1'$) of an outer boundary circle of the first cell and a radius ($R_2'$) of an outer boundary circle of the second cell according to the propagation model, where the signal strengths within the outer boundary circle of the first cell and within the outer boundary circle of the second cell are greater than a second threshold respectively, the second threshold being lower than the first threshold; and
  allocate to the second cell a PCI based on a distance relation between the first cell and the second cell, and
an interface operative to send the allocated PCI to the second cell, wherein the controlling unit is operative to:
  compare a distance between the first cell and the second cell with $Max[(R_1'+R_2), (R_1+R_2')]$; and
  responsive to the distance being greater than $Max[(R_1'+R_2), (R_1+R_2')]$, allocate to the second cell the same PCI as that of the first cell.

8. The apparatus of claim 7, wherein the controlling unit is further operative to:
  responsive to the distance being not greater than $Max[(R_1'+R_2), (R_1+R_2')]$, allocate to the second cell a PCI which is different than that of the first cell.

9. The apparatus of claim 7, wherein the controlling unit is further operative to:
  obtain a first maximum distance from an antenna of the first cell to the inner boundary circle of the first cell according to a path loss factor representing propagating loss over the first maximum distance and being associated with the first threshold, a geography environment factor, a height of the antenna of the first cell, and a city scale factor;
  determine the radius of the inner boundary circle of the first cell as one half of the first maximum distance when the antenna of the first cell is a directional antenna;
  determine the radius of the inner boundary circle of the first cell as equal to the first maximum distance when the antenna of the first cell is an omni antenna;
  obtain a second maximum distance from an antenna of the first cell to the outer boundary circle of the first cell according to a path loss factor representing propagating loss over the second maximum distance and being associated with the second threshold, a geography environment factor, a height of the antenna of the first cell, and a city scale factor;
  determine the radius of the outer boundary circle of the first cell as one half of the second maximum distance when the antenna of the first cell is a directional antenna;
  determine the radius of the outer boundary circle of the first cell as equal to the second maximum distance when the antenna of the first cell is an omni antenna;
  obtain a third maximum distance from an antenna of the second cell to the inner boundary circle of the second cell according to a path loss factor representing propagating loss over the third maximum distance and being associated with the first threshold, a geography environment factor, a height of the antenna of the second cell, and a city scale factor;
  determine the radius of the inner boundary circle of the second cell as one half of the third maximum distance when the antenna of the second cell is a directional antenna;
  determine the radius of the inner boundary circle of the second cell as equal to the third maximum distance when the antenna of the second cell is an omni antenna;
  obtain a fourth maximum distance from an antenna of the second cell to the outer boundary circle of the second cell according to a path loss factor representing propagating loss over the fourth maximum distance and being associated with the second threshold, a geography environment factor, a height of the antenna of the second cell, and a city scale factor;
  determine the radius of the outer boundary circle of the second cell as one half of the fourth maximum distance when the antenna of the second cell is a directional antenna; and
  determine the radius of the outer boundary circle of the second cell as equal to the fourth maximum distance when the antenna of the second cell is an omni antenna.

10. The apparatus of claim 7, wherein the controlling unit is further operative to:
  compare the distance between the first cell and the second cell with $(R_1'+R_2')$; and
  responsive to the distance being greater than $(R_1'+R_2')$, allocate to the second cell the same PCI as that of the first cell.

11. The apparatus of claim 8, wherein the PCI includes a group identity part, and the controlling unit is further operative to:
  allocate to the second cell the PCI with the same group identity part as that of the first cell.

12. The apparatus of claim 8, wherein the apparatus is located in an Operation & Maintenance (O & M) entity.

* * * * *